US007743032B2

(12) United States Patent
Gates et al.

(10) Patent No.: US 7,743,032 B2
(45) Date of Patent: *Jun. 22, 2010

(54) SCALABLE PROGRAMMABLE VIDEO RECORDER

(75) Inventors: Matthijs A. Gates, Seattle, WA (US); Jai Srinivasan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 369 days.

This patent is subject to a terminal disclaimer.

(21) Appl. No.: 11/868,160

(22) Filed: Oct. 5, 2007

(65) Prior Publication Data
US 2008/0021937 A1     Jan. 24, 2008

Related U.S. Application Data

(63) Continuation of application No. 10/172,551, filed on Jun. 14, 2002, now Pat. No. 7,289,716.

(51) Int. Cl.
*G06F 17/30* (2006.01)
(52) U.S. Cl. .............................. 707/650; 707/999.204; 719/328
(58) Field of Classification Search .................. 386/46, 386/83, 125; 707/650, 999.204; 719/328
See application file for complete search history.

(56) References Cited

U.S. PATENT DOCUMENTS

| 5,751,989 | A  | * | 5/1998 | Harrison ..................... 711/203 |
| 6,266,666 | B1 | * | 7/2001 | Ireland et al. ................. 707/10 |
| 6,714,720 | B1 | * | 3/2004 | Lightstone et al. ............ 386/46 |
| 6,760,535 | B1 | * | 7/2004 | Orr .............................. 386/46 |
| 6,971,121 | B2 | * | 11/2005 | West et al. ................... 725/142 |
| 6,990,677 | B1 | * | 1/2006 | Pietraszak et al. ............. 725/49 |

* cited by examiner

*Primary Examiner*—Cheryl Lewis
(74) *Attorney, Agent, or Firm*—Workman Nydegger

(57) ABSTRACT

A programmable video recorder (PVR) includes a writer application programming interface (API) and a reader API that operate essentially independently to enable the PVR to be networked to multiple reader applications. The writer API creates a backing store and a shared memory mapped file. The backing store stores streamed data in temporary files. The shared memory mapped file stores state information of the backing store files. The reader API receives requests from reader applications to access the stored streamed data. In response to the requests, the reader API permits the reader applications to access the shared memory mapped file to determine where the stored streamed data is located. Upon locating the stored data, the reader API permits the requesting reader applications to access the stored streamed data.

20 Claims, 10 Drawing Sheets

| FILE IDENTIFIER 1030 | FILE TYPE 1040 | FILE DURATION 1020 | | READER POSITION 1050 | NOTIFICATION EVENTS 1060 |
|---|---|---|---|---|---|
| F8 | TEMPORARY | 0 | 5 | READER R6 AT T1 | |
| F9 | PERMANENT | 5 | 10 | READER R4 AT T6 | |
| F10 | TEMPORARY | 10 | 12 | READER R5 AT T11 | READER R7 AT T13 |

FIG. 10

SCALABLE PROGRAMMABLE VIDEO RECORDER

CROSS REFERENCE TO RELATED APPLICATIONS

This application is a continuation of U.S. patent application Ser. No. 10/172,551, filed Jun. 14, 2002, and entitled SCALABLE PROGRAMMABLE VIDEO RECORDER. The present application claims priority to the foregoing application, which is incorporated herein by reference in its entirety.

BACKGROUND OF THE INVENTION

1. The Field of the Invention

The present invention is directed to methods for writing and reading streamed data and, more particularly, to methods for writing and reading streamed data in a Programmable Video Recorder (PVR).

2. Related Technology

The PVR, also known as the Digital Video Recorder (DVR), has recently entered the home entertainment market as device that is capable of providing many conveniences not previously considered practical for the traditional Video Cassette Recorder (VCR). For instance, the PVR can immediately access recorded data without having to fast-forward or rewind a videocassette in the sequential and time-consuming manner previously required by the VCR. This ability is largely a function of the type of data and the type of storage utilized by the PVR. In particular, the PVR utilizes digital data and a digital storage medium, which is capable of storing and indexing the digital data in such a manner that it can be accessed almost instantaneously.

Another convenience provided by the PVR, due to the digital medium in which it operates, is the ability of the PVR to record and play data at the same time. In particular, the PVR utilizes a writer, which writes the data to a storage medium, and a reader, which can read the data from the storage medium at substantially the same time the writer is writing data to the storage medium. It will be appreciated that the utility of being able to simultaneously record and play data at the same time is a significant advantage over the traditional VCR.

In particular, the PVR enables the viewer watching a live program to temporarily pause, rewind or replay a portion of the program without interrupting the recording of the program, such that the viewer can then later resume watching the program, including the portions of the program that were broadcast and recorded into the buffer during the temporary pause. It will be appreciated that this functionality is a result of the PVR having a writer and a reader that can perform their specific write and read functions somewhat independently. Nevertheless, as described below, the functionality of the reader is, in reality, heavily dependent upon the functionality of the writer.

Digital data, which is utilized by the PVR, is typically received in a streamed data format, which enables the data to be read and rendered while it is received, without having to first receive the entire contents of the file to which the data corresponds. There are various streaming standards and formats, which are known to those of ordinary skill in the art, including, but not limited to, MPEG (Moving Picture Experts Group), ASF (Advanced Streaming Format), AVI (Audio Video Interleave), Active Movie, Cinepaq, QuickTime, and Indeo.

Existing PVR devices are configured to operate with an appropriate streaming format, to provide the functionality described above. However, not all PVR devices are configured to operate with all streaming formats. Accordingly, for any PVR to function properly, the PVR must receive data in a format the PVR is designed to operate with. Otherwise, the writer will be unable to write the data and the reader will be unable to read the data in a manner that enables the PVR to function properly.

Although existing PVR devices are not all configured to utilize the same data formats, PVR devices are configured with a writer and a reader that are capable of operating with the same streaming format. Otherwise, the reader would be unable to read the data written by the writer, and would therefore render the PVR essentially inoperable.

Accordingly, although the writer and the reader function independently, to some degree, for enabling the PVR to record and play data at the same time, it will be appreciated that the reader is, in reality, substantially dependent on the writer. In particular, the reader can only read data once it has been written by the writer and is, therefore, dependent upon the writer writing data that the reader is capable of accessing and interpreting. For instance, if the reader is only capable of reading MPEG data, but the writer is only capable of writing ASF data then the PVR is, for all intents and purposes, inoperable. This is not a typical problem experienced by the PVR, however, since the PVR is specifically designed with the prior knowledge of how the reader will operate and the types of data the reader is capable of reading. Accordingly, the PVR is configured, at the time of manufacture, with a writer that is specifically designed to write data in the same format that can be read by the reader.

FIG. 1 illustrates one typical embodiment of an existing PVR 10 that is configured to receive streamed data from a streamed data source 20. As shown, the PVR 10 includes a tuner/decoder 30 that is configured to decompress the streamed data so that the writer 40 can write the streamed data to the storage medium of the PVR 10 into an appropriate format. The storage medium of the PVR 10 includes ring buffer 50. Ring buffers are well known by those of ordinary skill in the art.

During use, the reader 60 of the PVR 10 accesses and reads the streamed data from the ring buffer 50 and transmits the streamed data to the rendering device 70. The rendering device 70, which can include a display monitor or an audio system, ultimately renders the streamed data into the desired video and audio. Since the reader 60 and the writer 40 both directly access the ring buffer 50, it will be appreciated that for the existing PVR 10 to work, the reader 60 and the writer 40 must agree upon the data storage format used in ring buffer 50, that knowledge of this format must be built in to both the reader and the writer, and that neither of them can deviate from this format. Specifically, the writer 40 is configured to receive and write a pre-determined set of appropriate types of data to the ring buffer 50, which the reader 60 is correspondingly configured to read.

Configuring the PVR 10 with a writer 40 that will only write the appropriate type of data to the buffer 50 and in the appropriate manner is useful for ensuring that the reader 60 will be able to read the data once it has been written to the buffer 50. Nevertheless, this built in interdependency between the writer 40 and the reader 60 also significantly limits the scalability and utility of the PVR 10. In particular, limiting the type of data that can be written by the writer 40, to only the type of data formats that can be read by the reader 60, limits the utility of the PVR 10 to the functionality of that reader 60. This forecloses the utility that could otherwise be realized in recording different types of data that can be read and utilized by different types of reader applications.

Existing PVR devices are also not configured to interconnect with other reading devices and applications external to the PVR, inasmuch as it is impractical for the PVR to store data that cannot be utilized by the reader of the PVR. This, however, is an unnecessary limitation of existing PVR devices, inasmuch as this prevents external reader devices and applications for obtaining the data stored by the PVR, even when they are capable of reading and utilizing the stored data. Accordingly, the existing PVR is essentially un-scalable because it cannot be networked to external reader devices, and is, therefore, correspondingly limited to the functionality and operation of the single integrated reader incorporated within the PVR.

BRIEF SUMMARY OF THE INVENTION

The present invention is primarily directed towards methods for increasing the scalability of the programmable video recorder (PVR) so that the data stored within the PVR can be accessed and utilized by multiple and remote reader applications.

According to one aspect of the invention, the PVR isolates the writing and reading functions of the PVR so that the operation of the writer is not constrained by the limited capabilities of the reader. This is accomplished by providing a writer Application Programming Interface (API) and a reader API that operate substantially independently. Primitive operations performed by the writer API include the following: creating a backing store comprising a plurality of different files to store the streamed data; creating a shared memory mapped file that includes the state information of the backing store files; writing the streamed data into the appropriate files of the backing store; and writing the appropriate state information for the files of the backing store into the shared memory mapped file.

When a request from one or more reader applications for the stored streamed data is received, the state information for the stored streamed data is accessed from the shared memory mapped file through the reader API. Upon accessing the state information, the reader API permits the requesting reader applications to independently access the requested data from the backing store.

According to one aspect of the invention, the writer API 350 and the reader API 360 hide the specifics of the data storage format used in the backing store 372 from corresponding writing and reading modules. Without having to worry about the details of data storage, the writing module is able to write various types of data into the backing store without having to update or modify any existing reader applications for the different types of data that are being written. During use, the reader API enables one or more reader applications to access the recorded data regardless of the manner in which the data was recorded.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 10 illustrates one exemplary embodiment of a shared memory mapped file that corresponds to the backing store of FIG. 9.

DETAILED DESCRIPTION OF THE PREFERRED EMBODIMENTS

The present invention extends to methods, systems, and computer program products for buffering streamed data within devices (such as the Programmable Video Recorder (PVR)) that are configured to record and render streamed data. According to one aspect of the invention, the PVR includes a writer API and a reader API that function substantially independently, such that streamed data can be written to the backing store of the PVR without regard to the type of data that can be read by the reader application of the PVR. According to another aspect of the invention, a shared memory mapped file, or another shared memory data section, is created to store state information of the files in the backing store of the PVR. The shared memory mapped file can be accessed by multiple and remote reader applications to locate and access desired data from the backing store according to the methods of the invention.

The embodiments of the present invention may comprise a special purpose or general-purpose computer including various computer hardware, as described in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
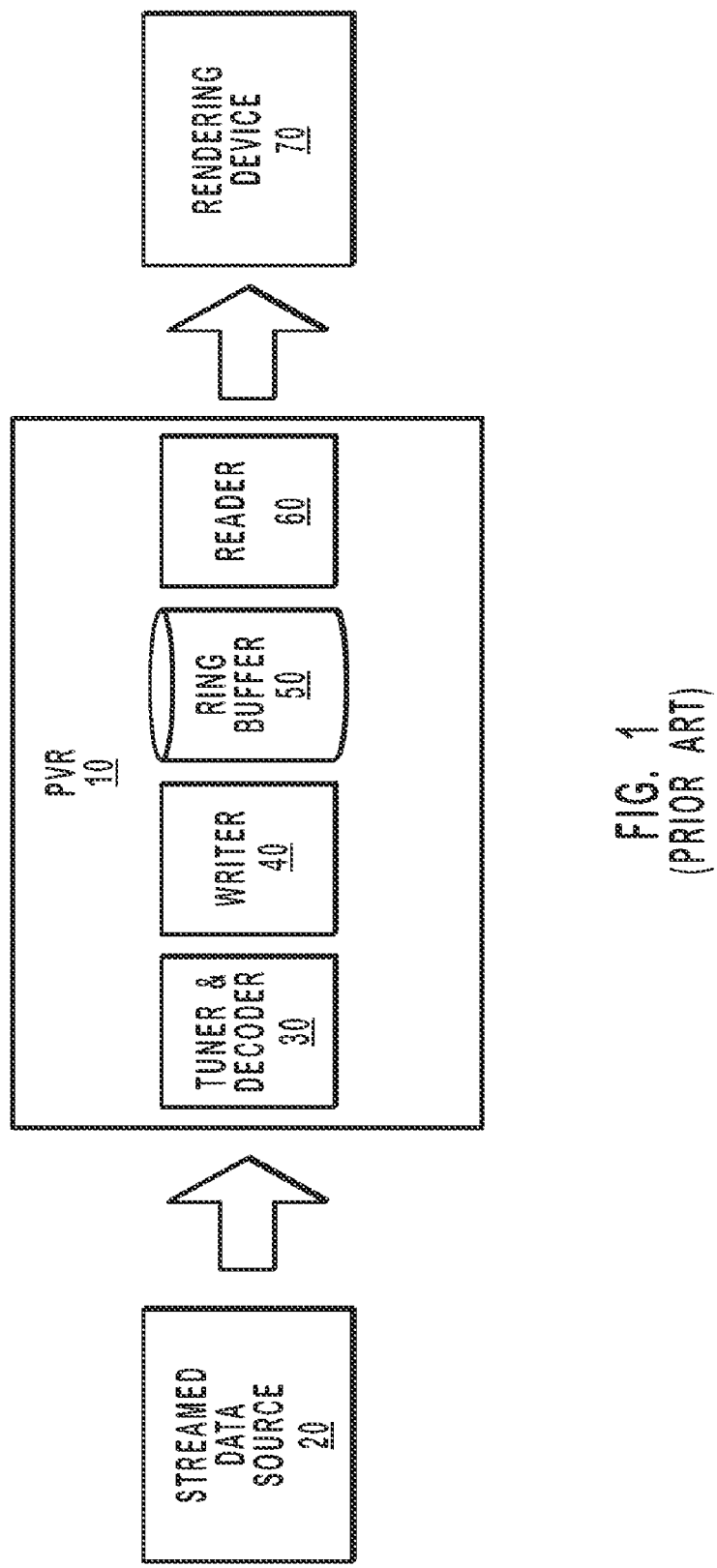
FIG. 1 illustrates a prior art programmable video recorder.
Figure 2:
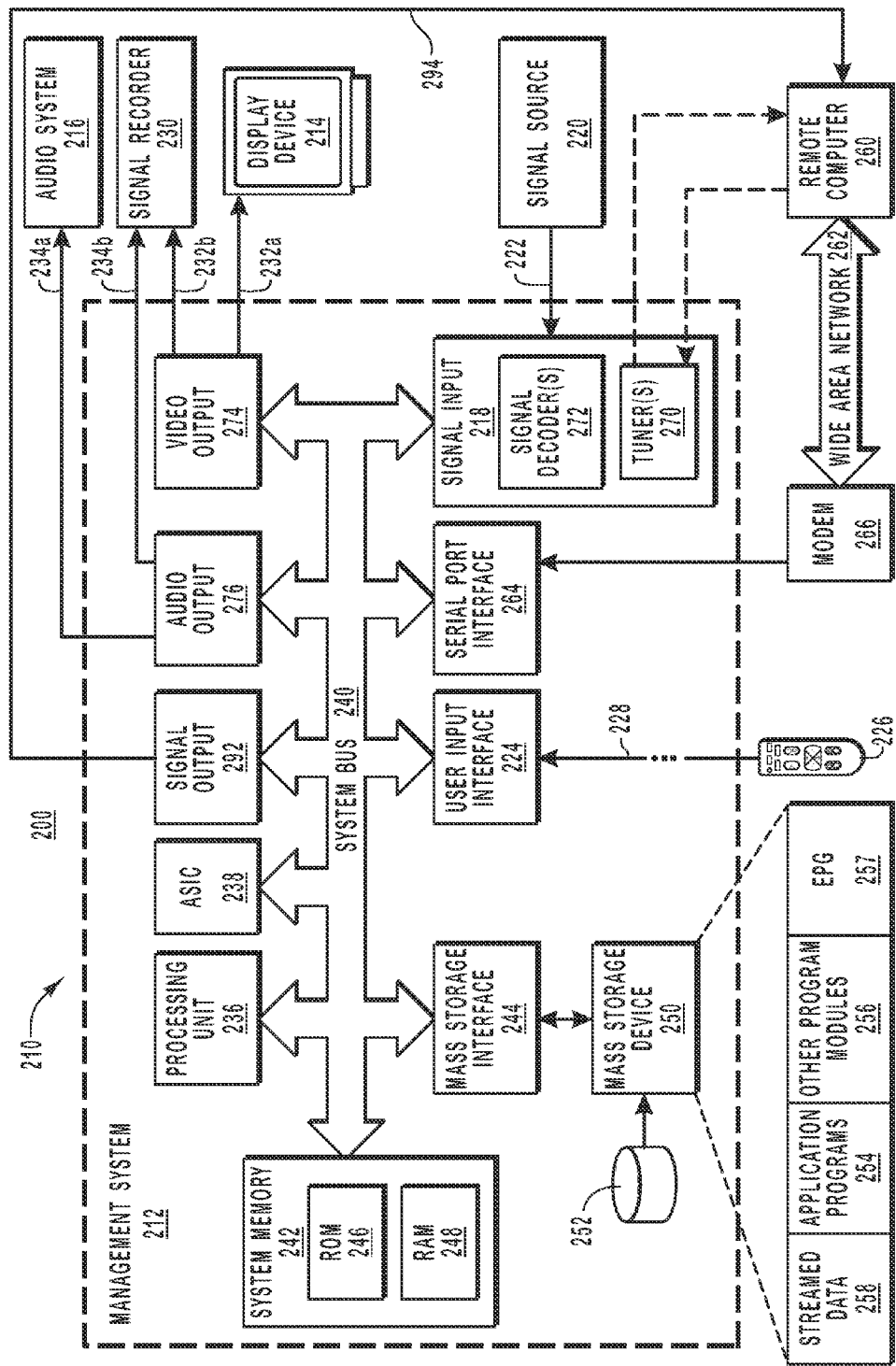
FIG. 2 illustrates one suitable network environment for practicing the methods of the invention.

FIG. 2 and the corresponding discussion provide a general description of a network 200 in which the present invention may operate. In one embodiment, the present invention is implemented in a network 200 that uses a conventional television screen or other display unit to display information and includes a programmable video recorder (PVR), digital video recorder (DVR) or a similar device that has been adapted to perform the operations that include receiving, writing, and reading streamed data so that it can be rendered in some desired manner. Streamed data includes data that has been formatted in such a manner that it can be accessed and rendered while it is being received, without having to first receive the entire file contents of the streamed data. Streamed data may include, but is not limited to, audio, video, meta-data, IP data, markers and events.

FIG. 2 illustrates a home entertainment system 210 that includes a management system 212, a display device 214 and an audio system 216. Management system 212 may be a PVR that has been adapted to perform the operations disclosed herein. Management system 212 may be integrally positioned with or separate from display device 214, which may be a high definition television display, a standard television display, a flat panel display, a projection device, a computer monitor, or any other device capable of displaying viewable video image data. Audio system 216 may be a speaker, a stereo system, or any device capable of emitting sound data, and similarly may be integrally positioned with or separate from display device 214.

Management system 212 includes a signal input 218, which receives streamed data from a signal source 220. The streamed data is transmitted from signal source 220 to signal input 218 via an input line 222, which can be a cable or optic connection, a terrestrial antenna system, a satellite system, or any device or system capable of transmitting streamed data to management system 212.

The signal source 220 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF, VHF, and ATVEF), and the like.

While FIG. 2 illustrates home entertainment system 210 as having a single programming input line 222 and a single signal source 220, there can instead be a plurality of programming input lines that transmit programming from a plurality of signal sources. In such embodiments, the home entertainment system 210 may receive the streamed data from one signal source or from a plurality of signal sources at a time.

Management system 212 also includes a user input interface 224, which receives input from an input device 226, such as a remote control, keyboard, microphone, or any other device capable of generating electronic instructions for management system 212. Input device 226 is communicatively coupled to management system 212 over an input link 228 so as to enable such control. Input device 226 generates electronic instructions over input link 228 in response to preprogrammed data or in response to a viewer pressing buttons on input device 226. Input device 226 may also control Web browser software within management system 212 as when the management system 212 receives streamed data through an Internet connection.

FIG. 2 further illustrates a signal recorder 230, which is capable of receiving streamed data, including streamed video and audio data, and which is further capable recording the streamed data on a storage medium associated with the management system 212. Video signals are transmitted to signal recorder 230 and display device 214 by video image links 232a and 232b, respectively, examples of which include a radio-frequency ("RF") link, an S-video link, a composite link, or any other equivalent form of video image link. Similarly, audio links 234a and 234b transmit audio data from management system 212 to audio system 216 and to signal recorder 230, respectively.

The operation of management system 212 is controlled by a central processing unit ("CPU"), illustrated as processing unit 236, which is coupled to an application-specific integrated circuit ("ASIC") 238 and uses computer-executable instructions implemented in software and/or hardwired logic circuitry. Processing unit 236 and ASIC 238 are coupled via a system bus 240, which also interconnects various other system components, such as the system memory 242, mass storage interface 244, user interface 224 and signal input 218. Processing unit 236 executes software designed to implement features of management system 212 including features of the present invention. ASIC 238 contains circuitry that is used to implement certain functions of management system 212. Instructions, data, and other software necessary for the operation of processing unit 236 and ASIC 238 may be stored in the system memory 242, such as in read-only memory ("ROM") 246 and/or in random-access memory ("RAM") 248, and/or in a mass storage device 250, which is coupled to mass storage interface 244. ROM 246, RAM 248 and mass storage device 250 are communicatively coupled to ASIC 238 so as to be readable by ASIC 238 and so that data may be written from ASIC 238 to RAM 248 and possibly mass storage device 250.

Mass storage device 250 may be a magnetic hard disk 252 or any other magnetic or optical mass memory device that is capable of storing large amounts of data. Any desired computer-readable instructions or data, including application programs 254, other program modules 256, and an electronic programming guide ("EPG") 257, which specifies the broadcast times and channels of programs can be stored in mass storage device 250. Mass storage device 250 can also be used to record streamed data 258, including multimedia data and non-multimedia data. Examples of multimedia data include audio data and video data. Examples of non-multimedia data include meta-data, markers, events, and IP data.

In the embodiment where management system 212 receives streamed data from the Internet, management system 212 communicates with a remote computer 260 via a wide area network ("WAN") 262 by including a serial port interface 264 that is interposed between the system bus 240 and a modem 266, a wireless link, or other means for establishing communications over a WAN that may be internal or external to management system 212. Management device 212 is also capable of transmitting information and receiving streamed data via the Internet by direct-dial communication over standard telephone lines, or by using any other available communication medium.

Referring now to signal input 218, if the signal on programming input line 222 includes multiple channels that are each receiving different streams of data, a tuner 270 included in signal input 218 tunes to a selected channel in the signal. Multiple tuners 270 can be used to provide enhanced features, such as recording streamed data from one channel while viewing streamed data on another channel, and recording streamed data from a plurality of channels simultaneously. A signal decoder 272 converts video data from an analog format to a digital format, or from a digital format to an analog format, in the event that ASIC 238 and tuner 270 employ different formats. Signal decoder 272 can also decode, decompress, and split audio, video, meta-data and other data from a compressed stream format (e.g. MPEG, ASF). In embodiments where the management system 212 includes multiple tuners 270, management system 212 may also include multiple signal decoders 272 to perform the operations disclosed herein.

Management system 212 also includes a video output 274 and an audio output 276 which are useful for transmitting data to rendering devices such as display device 214 and audio system 216. It will be appreciated, however, that the management system 212 is not limited to transmitting data to rendering devices. In particular, the management system 212 can also transmit data to any number of remote computing devices, such as remote computer 260, which are each independently configured with reader applications for reading data stored in the mass storage device 250 of the management system 212. The remote computer 260 can directly receive the data from the management system 212 through an output line 294, which can be a cable or optic connection, a terrestrial antenna system, a satellite system, or any device or system capable of transmitting streamed data to home management system 212. Alternatively, the remote computer 260 can indirectly receive the data from the management system 212 through the wide area network 262.

While FIG. 2 and the corresponding discussion above provide a general description of a suitable environment in which the invention may be implemented, it will be appreciated by one of ordinary skill in the art, upon reading this application, that the methods of the present invention may be practiced in association with a variety of different system configurations.

Figure 3:
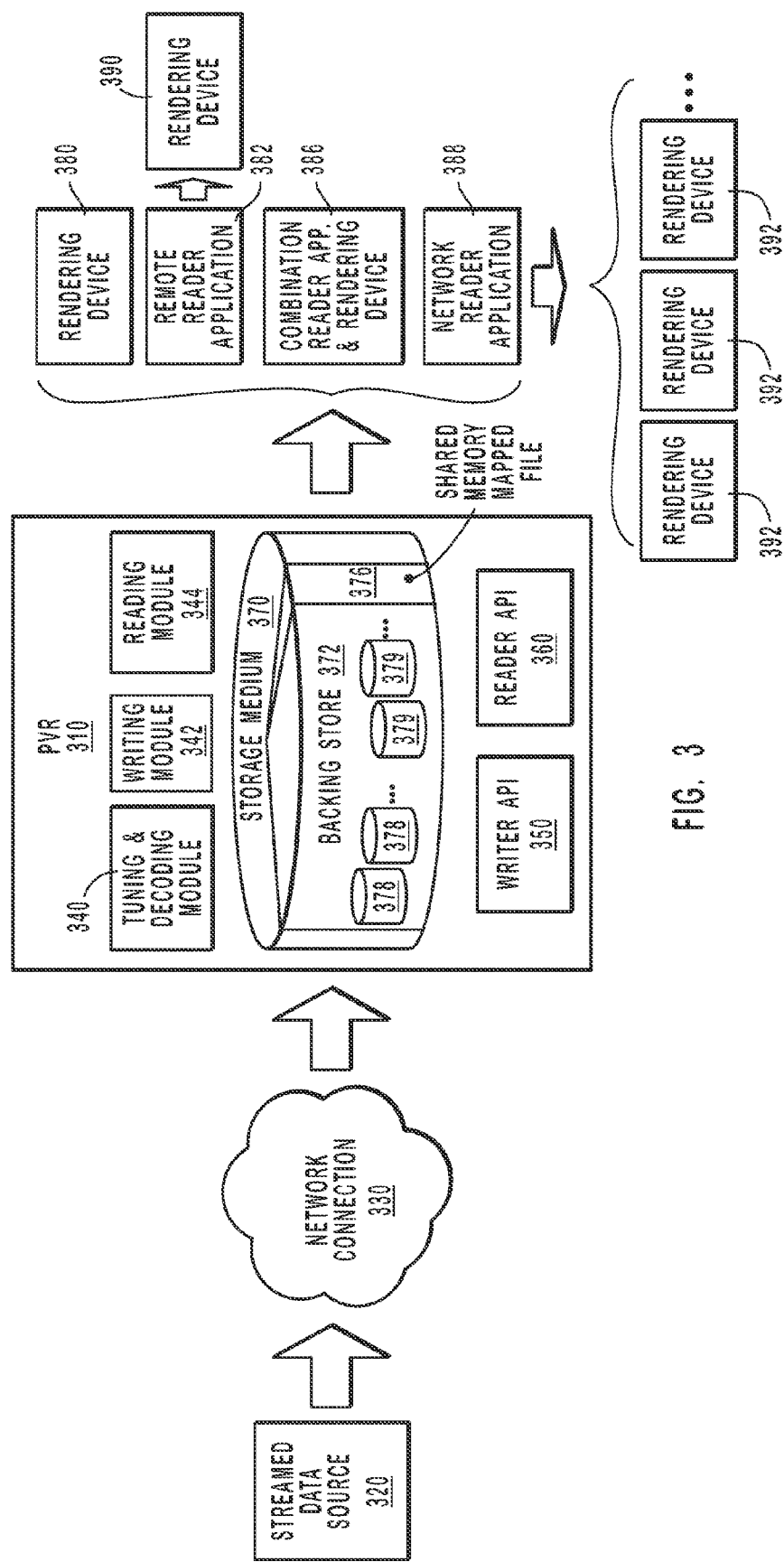
FIG. 3 illustrates one exemplary embodiment of the programmable video recorder of the present invention that includes a writer API, a reader API, and a storage medium, and in which the PVR is in communication with a streamed data source and a plurality of reader applications.

FIG. 3 illustrates one exemplary computing system and environment for practicing the methods of the invention. As shown, the computing system includes a programmable video recorder (PVR) 310 in communication with a streamed data source 320. It will be appreciated, however, that although the PVR 310 is shown to be in communication with the streamed data source 320 through a network connection 330, the PVR 310 can communicate with the streamed data source 320 with any suitable communication means, including a cable or optic connection, a terrestrial antenna system, a satellite system, the Internet, or any other device or system capable of transmitting streamed data to the PVR 310.

As mentioned above, streamed data can include multimedia data, such as audio and video data, as well as non-multimedia data, such as meta-data, markers, events, and IP data, all of which are well known in the art. The streamed data can also be encoded according to any suitable standard and format, including, but not limited to MPEG, ASF, AVI, Active Movie, Cinepaq, QuickTime, and Indeo. The term "streamed data" and "data" are at certain times used interchangeably herein.

Although the PVR 310 is shown to be in communication with only a single streamed data source 320, it will also be appreciated by one of ordinary skill in the art, upon reading this application, that the PVR 310 can communicate with multiple streamed data sources, thereby enabling the PVR 310 to receive a plurality of different streamed data signals at the same time.

Upon receiving the streamed data, the PVR 310 processes and stores the streamed data so that it can be accessed and read by an appropriate reader application and rendered by an appropriate rendering device. To enable the PVR 310 to process and store the streamed data according to the methods of the invention, the PVR 310 is configured with a plurality of modules, including a tuning and decoding module 340, a writing module 342 and a reading module 344. The PVR 310 also includes a writer API 350, a reader API 360, and a storage medium 370, each of which will now be described in detail.

The tuning and decoding module 340 is configured to receive the streamed data from the streamed data source 320, and when necessary, split the streamed data into appropriate and individual streams, such as audio streams, video streams, IP data streams, and so forth. Decompression and de-multiplexing of the streamed data may also performed by the tuning and decoding module 340 when necessary. It will be appreciated that the tuning and decoding module 340 is not limited to receiving data through a broadcast signal. Accordingly, the tuning and decoding module 340 can also be considered a receiving module for receiving data through the Internet, another network connection, or from other sources of streamed data such as file sources.

According to one aspect of the invention, the writer API 350 creates a backing store 372 in the storage medium 370 that has any number of files that are appropriately configured to store the streamed data, so that the streamed data can be accessed and rendered at a later time, at the viewer's discretion. In one embodiment, the backing store includes a plurality of temporary files 378 and permanent files 379 that are used to buffer the streamed data, as described below.

The writing module 342 is configured to write the streamed data to the backing store 372 of the storage medium 370 as directed by the writer API 350. The writing module 342 is also able, according to one embodiment, to write the streamed data to more than one file at a time. This is useful when the streamed data includes a plurality of different streams, so that each of the different streams can be written to appropriate files without causing data to be lost, which can occur when the writing module 342 is unable to write data as fast as it is received.

The writer API 350 also creates a shared memory mapped file 376 within the storage medium 370, which contains state information corresponding to the files 378 and 379. As described below in more detail, the shared memory mapped file 376 enables reader applications to locate and access the streamed data stored within the backing store 372. The shared memory mapped file 376, which is described below in more detail, is only one example of a suitable shared memory data section that may be used to store state information corresponding to the files. Accordingly, the invention extends to the use of any shared memory data section or index that can be used to store state information that corresponds to the files.

Although the backing store 372 and the shared memory mapped file 376 are shown to be included within the storage medium 370 of the PVR, it will be appreciated by one of ordinary skill in the art upon reading this application that the backing store 372 and the shared memory mapped file 376 can also be contained within independent mass storage devices that are located outside of the storage medium of the PVR 310 and which are accessible by the PVR 310. Although the temporary files 378 and the permanent files 379 of the backing store are shown in the present embodiment to be located within the same mass storage medium 370, it will also be appreciated by one of ordinary skill in the art upon reading this application that the temporary files 378 and the permanent files 379 can be located in a number of different mass storage mediums that can be accessed by the PVR 310.

The reading module 344 accesses and reads streamed data from the backing store 372, as instructed by the reader API 360. When necessary, the reading module 344 also decompresses and splits the streamed data into appropriate signals to be rendered by a rendering device 380 associated with the PVR 310, such as, for example, a television, a monitor, an audio system, and other similar rendering devices.

The reader API 360 is configured to receive and manage requests from one or more reader applications to access the streamed data stored on the backing store 372. The terms "reader application," "reading module," and "reader" are sometimes used interchangeably herein.

Upon receiving a request for streamed data, the reader API 360 permits the one or more requesting reader applications to access the shared memory mapped file 376 to determine where the desired data is located. Upon determining where the desired data is located, the reader API 360 enables each of the requesting reader applications to retrieve the data. The reader API 360 also monitors requests for data that has not yet been written to the backing store 372 so that when the data is finally written to the backing store 372, the data can be accessed by the requesting reader application. According to one embodiment, the reader API 360 may permit multiple reader applications to access and read data from the backing store, independent of each other, and potentially even at the same time.

Examples of reader applications that may access the stored data from the backing store 372 include the reading module 344 of the PVR 310, remote reader application 382, combination reader application and rendering device 386, and network reader application 388. A non-limiting example of the remote reader application 382 includes a remote computer device, which is independently capable of processing the streamed data into an appropriate signal that can be transmitted to and rendered by a corresponding rendering device 390 that is in communication with the remote reader application 382. A non-limiting example of the combination reader application and rendering device 386 includes a rendering device, such as a television, that has a built-in reading module for processing the streamed data into appropriate signals that can be rendered. A non-limiting example of the network reader application 388 includes a server or a proxy computer that communicates with a plurality of rendering devices 392 through a Local Access Network (LAN) or a Wide Area Network (WAN), such as the Internet.

The PVR 310 communicates with rendering device 380 and each of the remotely located reader applications 382, 386, 388 through an appropriate networking connection, such as, but is not limited to, cable and optic connections, terrestrial antenna systems, and satellite systems. As described above in reference to FIG. 2, the appropriate networking connection may include signal output 292 and output line 294. It will be appreciated by one or ordinary skill in the art after having reviewed this specification that, upon practicing the methods of the invention, each of the reader applications 344, 382, 386, and 388 may independently and simultaneously access the data stored within the backing store 370. This can be useful, for example, to enable different viewers to independently watch, pause, rewind or otherwise utilize program data buffered in the backing store 370 at the same time. Moreover, it will be appreciated that the writer API 350 and the reader API 360 hide the specifics of the data storage format used in the backing store 372 from the writing module 342 and the reading module 344 respectively. This means that the writing module 342 can be extended to write new types of data into the backing store 372 without having to update or modify the existing reader applications 344, 382 386 and 388, while permitting new reader applications to access the new types of data.

For example, a first viewer can watch a replay of a program stored in the backing store 372, through the PVR, at the same time a second viewer watches a different replay of the same program through the PVR. It will be appreciated by one of ordinary skill in the art upon reading this application that this is a significant advantage over existing PVR devices that utilize only a single reader application and which are only capable of executing a single read function at a time.

Figure 4:
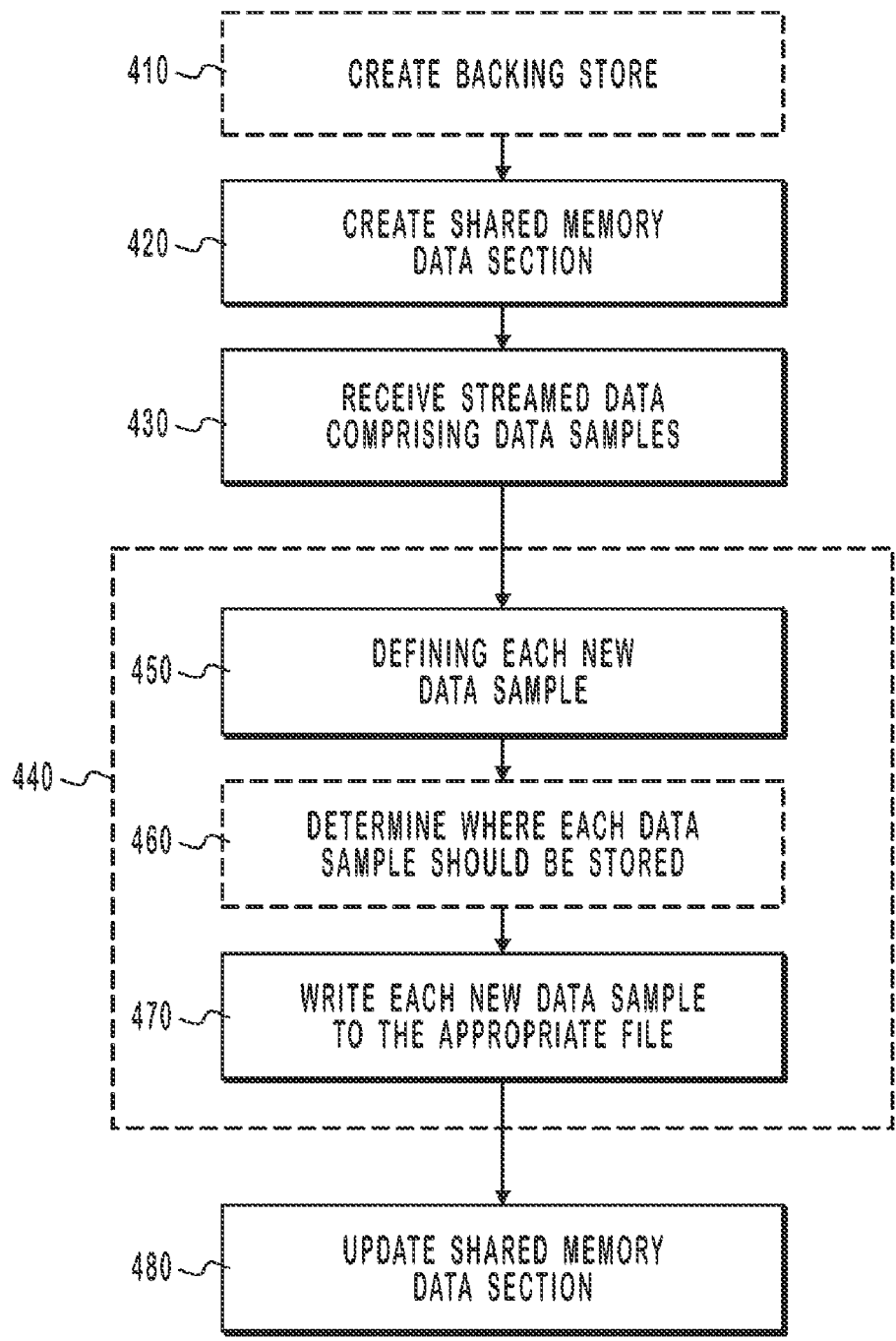
FIG. 4 illustrates certain primitive operations of the writer API comprising various steps and acts for storing streamed data in an accessible manner within a backing

Attention is now be directed to FIG. 4, which illustrates a flow chart containing some of the primitive operations implemented by the writer API during implementation of the methods of the invention. Each of the primitive operations associated with the writer API 350 are described below in terms of steps and acts performed by the writer API. In the present illustration, the steps 410, 440 and 460 performed by the writer API are bounded by dashed lines and the acts 420, 430, 450, 470 and 480 performed by the writer API are bounded by solid lines.

The first illustrated step performed by the writer API includes the step for creating a backing store in the storage medium of the PVR (step 410). According to one embodiment, the step for creating the backing store (step 410) includes the corresponding acts of specifying a total number of files that are permitted in the backing store, and specifying the duration of streamed data each file is permitted. By specifying the duration of streamed data each file is permitted, rather than specifying the byte size of each file, as is done by prior art devices, the PVR is able to know the exact duration of content contained within each of the files. Knowing the exact duration of content contained within a file can be useful, for example, when a viewer wishes to rewind a program a specific amount of time.

Figure 5:
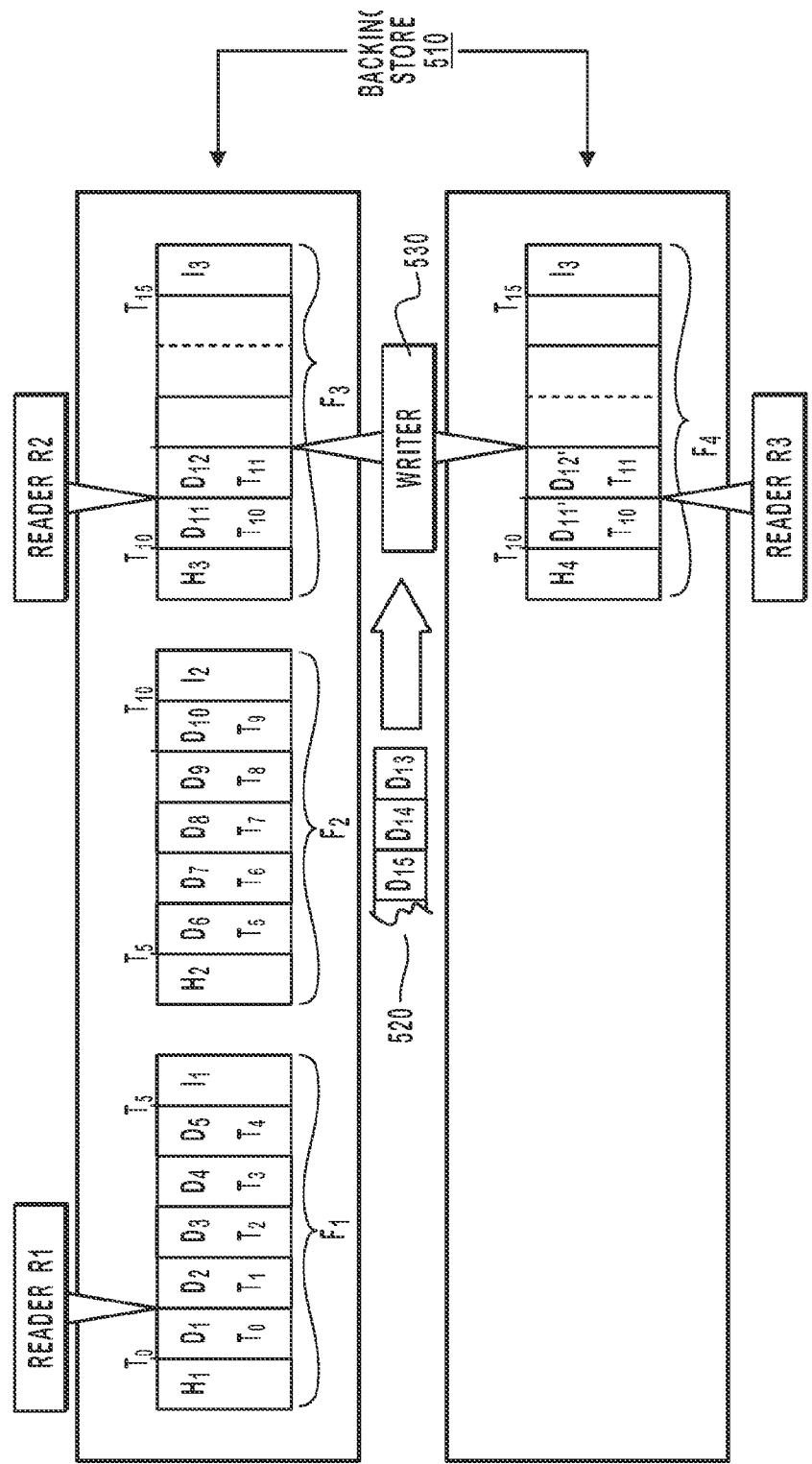
FIG. 5 illustrates one embodiment of the backing store that includes four temporary files.

According to one embodiment, the duration of content assigned to each file within the backing store is sequentially assigned to the files as they are opened, such that the files sequentially string together the content of the streamed data. For example, if a first file is assigned the first ten minutes of content then the next file may be assigned a duration of content for the following ten minutes, from the ten minute mark to the twenty minute mark. For example, as illustrated in FIG. 5, the backing store 510 includes four temporary files F1, F2, F3 and F4. File F1 is assigned a duration of content corresponding to time T0 thru time T5, file F2 is assigned a duration of content corresponding to time T5 thru time T10, and file F3 is assigned a duration of content corresponding to time T10 thru time T15. File F4, which is also shown in FIG. 5 to be assigned a duration of content corresponding to time T10 thru time T15, will be described in more detail below.

It will be appreciated by one of ordinary skill in the art upon reading this application that the duration of streamed content each temporary file can contain may be varied to accommodate different needs and preferences. For example, the duration may be limited to six minutes, ten minutes, twenty minutes, or any other duration. Although smaller durations are sometimes useful for minimizing how much data is lost at any given time when the temporary files are overwritten, as described below, it will be appreciated by one of ordinary skill in the art upon reading this application that the durations are not necessarily small or limited to any particular duration.

Upon creating the backing store (step 410), as shown in FIG. 4, the writer API performs the act of creating a shared memory data section (act 420). The act of creating a shared memory data section generally includes the acts of defining and storing state information for each of the files stored in the backing store. According to one aspect of the invention, the shared memory data section is updated whenever the state information of a file changes. Non-limiting examples of state information include the duration of content assigned to each file, the duration of content written to each file, the type of data written to each file, an indication of whether the file is a permanent file or a temporary file, and address information pointing (directly or indirectly) to the location of the file in the backing store. The shared memory data section and the state information contained within the shared memory data section are described in more detail below, with specific reference to creating a shared memory mapped file, in reference to FIGS. 8 and 9. A shared memory mapped file is one embodiment of a shared memory data section.

The writer API may then perform an act of receiving the streamed data from the streamed data source (act 430). According to one embodiment, streamed data includes a plurality of discrete data samples that are streamed together with a streaming format, such as, but not limited to, MPEG, ASF, AVI, Active Movie, Cinepaq, QuickTime, and Indeo. Unlike certain prior art devices that are configured to only receive streamed data that is formatted according to a single preferred streaming format that can be read by the integrated reader of the PVR, the writer API of the present invention is configured to receive streamed data of many different streaming formats, regardless of the specific capabilities of the integrated reader of the PVR.

As shown in FIG. 4, the writer API is also capable of performing the step for writing the streamed data to the backing store (step 440). The step for writing the streamed data to the backing store (step 440) can be accomplished by executing the corresponding act 450, step 460 and corresponding act 470, as described below.

Initially, while receiving the streamed data (act 430), the writer API identifies and defines the corresponding data samples as they are received (act 450). Defining the data samples of the streamed data can include defining the type of data contained within each data sample, the format used to encode the data into a stream, the data source, and any other useful information pertaining to the data. Examples of different types of data that can be defined include multimedia data, such as audio data and video data, and non-multimedia data, such as meta-data, markers, events, and IP data, each of which are well known in the art. Defining each data sample can also include the act of assigning a time stamp to each data sample that corresponds to the time in which the data sample was received. Assigning a time stamp to each data sample can be useful for enabling each of the data samples to be retrieved at a later time based on a request for a data having a desired time stamp. Data samples can be indexed by one or more time stamps within each file in the backing store.

Upon identifying and defining the new data samples of the streamed data, the writer API further engages in the step for determining where each newly received data sample should be stored (step 460). This can initially be accomplished, by determining whether any existing file in the backing store is suitably configured to store the data. In one embodiment, a file is suitably configured to store a data sample only when the file is assigned a duration of content that corresponds to the time stamp of the data sample. In another embodiment, the file is suitably configured to store a data sample only when the file is assigned to store the same type of data as the data sample (e.g. audio, video, IP data, and so forth).

When there is no file suitably configured to store the data sample and the total number of permitted files for the backing store have not yet been opened, then the method may also include the act of opening a new file that is suitably configured to store the data sample. Alternatively, when an appropriate file to store the data sample is not open and the total number of permitted files for the backing store have already been opened, then the method may include the act of overwriting an existing file with a new file that is suitably configured to store the data sample. Upon determining where a data sample should be written (step 460), the data sample is finally written to the appropriate file (act 470).

FIG. 5 illustrates how data samples, such as data samples D1, D2, D3, and so on are written to the backing store 510 according to the methods of the invention. Initially, each of the data samples is assigned a time stamp corresponding to the time it is received. Then, each of the data samples is written to an appropriate file in the backing store 510 that has an appropriate duration corresponding to the assigned time stamp. For example, data sample D12 is assigned a time stamp of T11 and is written to file F3 since file F3 has an assigned duration of T10 thru T15.

The type of data pertaining to the data sample can also be a factor in determining where the data sample is stored. For example, in the present embodiment, data sample D11', which comprises IP data, and data sample D11, which comprises video data, were both received together at the same time, such that they both received the same time stamp of T10. When data samples D11 and D11' where received from the data stream 520, they were split apart with the tuning and decoding module of the invention, which is described above with reference to FIG. 3. In the present embodiment, file F3 is configured to store multimedia data and file F4 is configured to store non-multimedia data. Accordingly, the data sample D11, comprising video data, is written to file F3, and data sample D11', comprising IP data, is written to file F4. Data samples D11 and D11' are written to the appropriate files by writer 530, which corresponds to the writing module described above.

According to another aspect of the invention, data samples are assigned to different files according to the data stream or data source from which they are received. This embodiment is particularly useful when multiple data streams are received at the same time by the PVR.

Figure 6:
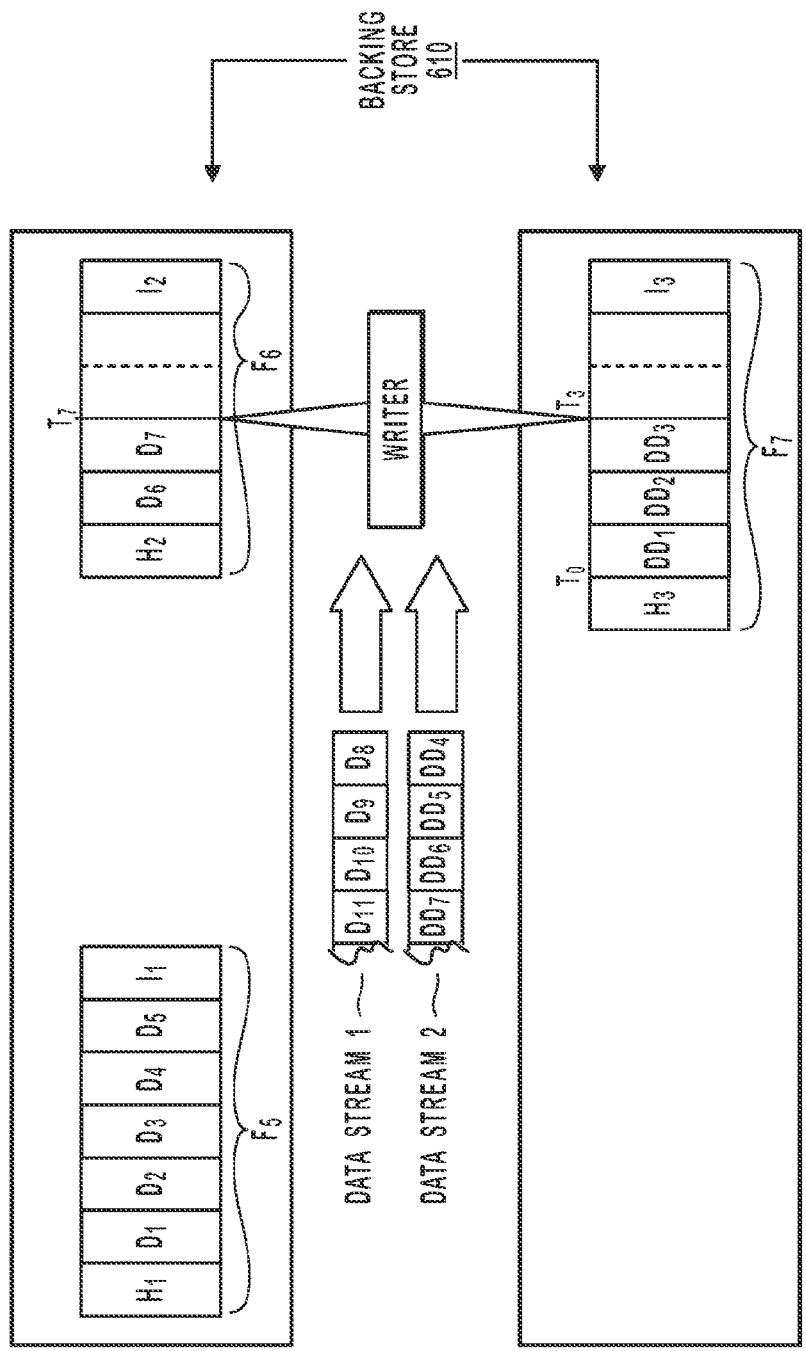
FIG. 6 illustrates one embodiment of the backing store in which two streams of data from different data sources are written to the backing store.

FIG. 6 illustrates one embodiment in which data samples received from multiple data streams at the same time are written to different files F5, F6 and F7 of the backing store

610. As shown, data samples D1 thru D7 (which were received from data stream 1) are written to files F5 and F6, whereas data samples DD1, DD2 and DD3 (which were received from data stream 2) are written to file F7.

Data stream 1 and data stream 2 can be formatted with the same format or different formats according to the invention. It will be appreciated by one of ordinary skill in the art upon reading this application that this is an improvement over conventional technology inasmuch as this enables the PVR to receive and store data that can be utilized by multiple reader applications having different capabilities to read different types of formatted data. In particular, the backing store 610 can buffer streams of data that are encoded in formats that cannot be read or utilized with the single incorporated reader application. Although only two streams are shown in the present embodiment, it will also be appreciated by one of ordinary skill in the art upon reading this application that additional streams of data may be received and stored in the backing store 610. The quantity of streams that can be received by the PVR is only constrained by the capacity of the storage medium in which the backing store 610 is located.

By storing the streamed data into different files based on different criteria, as described above, it is useful to index the data so that it can be accessed and utilized at a later time by the one or more reader applications in communication with the PVR. One method for indexing the stored data according to the invention is to update the shared memory data section (act 480), which is described above in reference to act 420, so that it contains valid state information for the files that are storing the data. According to one embodiment, the shared memory data section is updated whenever a new file is created and whenever new data is written to a file (step 440).

A description of a shared memory mapped file, which is one suitable example of a shared memory data section, will now be provided with specific reference to FIGS. 5 and 7-10.

Figure 7:
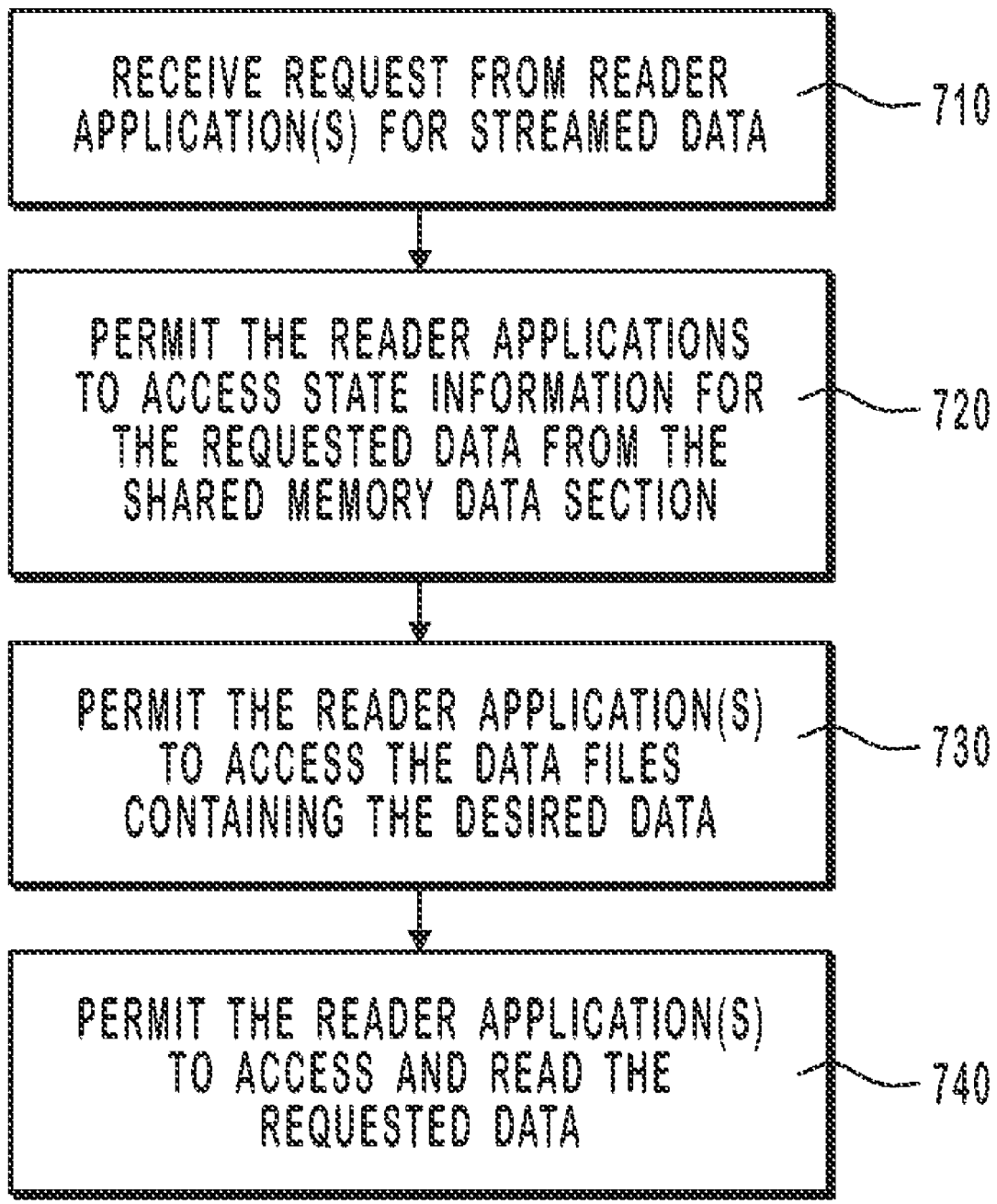
FIG. 7 illustrates certain primitive operations of the reader API including various acts for accessing stored data from the backing store in response to requests from one or more reader applications.

Attention is first directed to FIG. 7, which illustrates certain primitive operations associated with the reader API for enabling reader applications to read the stored data from the backing store with the assistance of the shared mapped memory file. Each of the primitive operations associated with the reader API is described below as acts performed by the reader API.

Initially, upon receiving a request from one or more reader applications to access the streamed data (act 710), the reader API permits the reader applications to access the state information contained in the shared memory data section (act 720). Next, the reader API permits the reader applications to access the data files containing the desired data according to the recorded state information (act 730). Finally, the reader applications are permitted to access and read the requested data (act 740).

Figure 8:
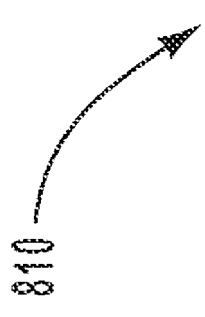
FIG. 8 illustrates one exemplary embodiment of a shared memory mapped file that corresponds to the backing store of FIG. 5.

FIG. 8 illustrates one embodiment of a shared memory mapped file 810, which corresponds to the files F1, F2, F3, and F4 in FIG. 5. As shown, the shared memory mapped file 810 includes various state information corresponding to the various files F1, F2, F3, and F4 of the backing store. In the present embodiment, state information includes the file duration 820 and a file identifier 830 of each file. The file identifier 830 may be any substantially unique identifier from which the location of the file may be directly or indirectly determined including, for example, file names, file pointers and handles. This state information, when accessed by the reader API or by a reader application through the reader API enables the desired data to be located and obtained.

For example, if a reader application, such as reader R1 (see FIG. 5), seeks program data that corresponds to time T1 in a program then the reader API will direct reader R1 to the location of file F1 since file F1 is shown to contain data content pertaining to time T0 to time T5. Once the reader R1 is able to locate file F1, the reader R1 can precisely access the desired data D2 by referencing an index I1 associated with the file F1 that indexes each of the data samples D1, D2, D3, D4 and D5 by their corresponding time stamp, as generally described above. The reader R1 may also access header H1, which may contain information that is required for properly reading the data samples contained within the file F1.

According to one aspect of the invention, the backing store 510 can also be accessed by a plurality of different reader applications at the same time. For example, as shown, reader R2 and reader R3 access files F3 and F4 of the backing store 510, respectively, at the same time reader R1 accesses file F1 of the backing store, even though the actual content that is being simultaneously accessed by reader R1 has a different associated time stamp (namely, T1) than the content accessed by the readers R2 and R3 (namely, T11). Each of the readers R1, R2, and R3 can be remote reader applications or integrated reader applications. It will be appreciated by one of ordinary skill in the art upon reading this application that this is a significant advantage over the prior art PVR devices that are only configured to operate with a single integrated reader application.

One particularly useful advantage of the present PVR solution is that different readers can access the same or different information from the backing store 510 at the same time. For example, in the present embodiment, reader R2 seeks video data having a time stamp of T11 from data stream 520, while at the same time reader R3 seeks IP data having the same time stamp from data stream 520. In the present embodiment, state information includes the type of data 840 that is stored in the files, such that it can be determined that file F3 contains video data at the desired time T11 (see the second to last row of shared memory mapped file 810). It can also be determined that file F4 contains IP data a time T11 (see the last row of shared memory mapped file 810). Upon accessing this state information, the readers R2 and R3 are permitted by the reader API to access the appropriate files having the desired data, D12 and D12', respectively.

The shared memory mapped file 810 can also be configured with state information regarding the file type 850 and the reader position 860 of each file in the backing store. This state information is useful, as described below, for helping locate the desired data and for cuing reader application requests for data that is not yet written.

Figure 9:
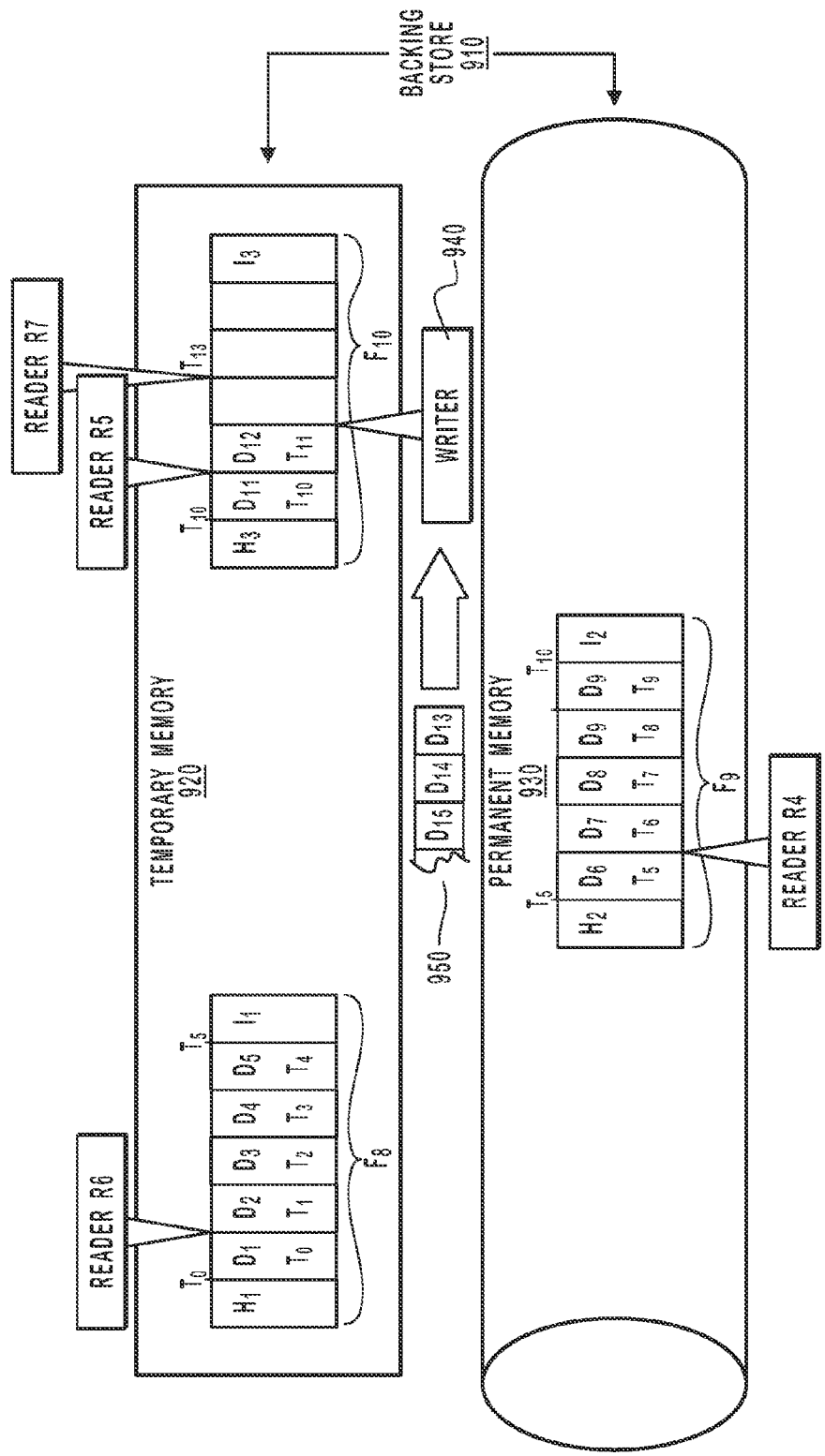
FIG. 9 illustrates one exemplary embodiment of a backing store that includes a temporary memory and a permanent memory.

FIG. 9 illustrates one embodiment of the backing store 910 that includes both temporary memory 920 and permanent memory 930. Accordingly, temporary files F8 and F10 can be overwritten during normal buffering operations, whereas permanent file F9 is archived and will not be overwritten. The temporary memory 920 and permanent memory 930 can be located in the same mass storage or in different mass storage. One reason for separating permanent memory 930 from temporary memory 920 is so that the permanent files can be easily transported after being recorded. For example, the permanent file F9 may be stored on a magnetic disk that is removable from the PVR.

It will be appreciated by one of ordinary skill in the art upon reading this application that the permanent memory 930 can also be used to maximize the use of the temporary memory 920. For example, when a viewer wishes to make a permanent file of certain data, the permanent memory F9 can be used as part of the buffer in the backing store 910, such that the recorded data does not have to also be recorded in the temporary memory 920, thereby minimizing the resources required to store the data.

During use, the writer API causes the writer 940 to write data samples to the backing store 910 as the data samples are received from the data stream 950. According to one present embodiment, the files of the backing store 910 are also defined as to whether they are stored in temporary memory 920 or permanent memory 930. Criteria for determining whether a data sample should be written to temporary or permanent memory may be based upon viewer instructions received by the PVR.

In the present embodiment, viewer instructions have been received that indicate the content of the data stream 950 that pertains to time T5 thru T10 should be archived. Accordingly, as shown, data samples D6, D7, D8, D9, and D10 are written to permanent file F9, whereas the remaining data samples are written to temporary files F8 and F10, as they are received. When data samples D13, D14 and D15 are received, they will also be written to the backing store 910 in the order they are received.

Now turning to FIG. 10, it is shown how the state information corresponding to files F8, F9 and F10 has been created and updated in the shared memory data section (shared memory mapped file 1010), according to the invention, so that reader applications can access the desired data from the files F8, F9, and F10. In the present embodiment, the state information of the files includes the duration 1020 of content stored in each file, a file identifier 1030 from which the file location may be directly or indirectly determined, and the description of the file type 1040.

It will be appreciated by one of ordinary skill in the art upon reading this application that the file type 1040 is useful for locating files that are stored in different storage locations within the backing store. For example, in the present embodiment of FIG. 9, reader R4 is seeking data from the data stream pertaining to time T6. As indicated by the shared memory mapped file 1010, this data is located in file F9, in permanent memory 930. Accordingly, to help ensure that the data located within the permanent memory 930 can be accessed by reader applications, it is useful to include the file type 1040 in the shared memory mapped file 1010. Identifying the file type 1040 is particularly useful when the permanent files and temporary files are located in different storage media, as described above. It is also necessary to help determine which files in the backing store can be deleted or overwritten when the writer has to create a new temporary file and the memory allocated to the backing store cannot be increased.

FIG. 10 also illustrates that the shared memory mapped file 1010 can include reader position 1050 and notification events 1060. These items are particularly useful for cueing requests from reader applications for data that has not yet been written. For example, in the present embodiment of FIG. 9, reader R7 is requesting data corresponding to data stream 950 that pertains to time T13. This data will be located within file F10 once it is written. However, only content pertaining to time T10 thru T12 has thus far been written to file F10. Accordingly, a notification event 1062 is placed in the shared memory mapped file 1010 to indicate that reader R7 is waiting for data commencing at time T13. Once writer 940 receives and writes the data to file F10 that corresponds to time T13 then the reader R7 will be notified by the reader API that the data is available. Then, the reader R7 will be permitted to access the desired data commencing at time T13.

Although examples have been provided in which the shared memory data section comprises a shared memory mapped file, it will be appreciated that the invention extends to the use of any shared memory data section. Furthermore, despite the specific examples of the shared memory mapped file that have been provided, it will be appreciated that the shared memory data section of the invention can include additional state information corresponding to the stored files, that is not shown to be included within the specific examples of the shared memory mapped file. Additionally, the primitive operations associated with the reader API and the writer API can also be executed in a variety of different orders to accommodate different needs and preferences.

It will be appreciated that the present invention provides a significant advantage over existing PVR devices that are configured to operate with only a single reader application and to utilize only a single type of streamed data. In particular, the methods of the present invention enable a PVR device to buffer multiple types of streamed data that can be accessed by multiple reader applications, even remote reader applications, independently, and simultaneously. The invention also generally enables a writer API and a reader API to hide the specifics of data storage formatting that is used in the backing store from corresponding writing and reading modules, thereby enabling a wide variety of data types to be recorded and read, even when the writing and reading modules are not specifically designed to write and read the said variety of data types.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having stored computer-executable instructions for implementing a method in a computing system wherein streamed data is received and processed to create a backing store from which the streamed data can be accessed for subsequent utilization, and wherein one or more reader applications are capable of accessing the streamed data contained in the backing store, the method for separating the process of data capture when creating the backing store from the process of reading the backing store, and for enabling one or more reader applications to access the backing store, wherein the method includes:
   a step for writing streamed data in the backing store through a writer API that is comprised of a first set of primitive operations that are invoked when writing the streamed data to the backing store;
   acts of defining and storing in the backing store state information for the streamed data as stored;
   an act of permitting one or more reader applications to access the state information for the streamed data as stored; and
   an act of permitting the one or more reader applications to access, independent of one another, and through a reader API that is comprised of a second set of primitive operations, the streamed data stored in the backing store, consistent with the state information obtained by a given reader application, and without having the first set of primitive operations of the writer API imposed when reading the streamed data from the backing store.

2. A computer program product as recited in claim 1, wherein prior to writing streamed data in the backing store, the method includes creating the backing store in a storage medium of the computing system and specifying a total number of temporary files permitted to be stored in the backing store.

3. A computer program product as recited in claim 1, wherein prior to writing streamed data in the backing store, the method includes creating a shared memory data section configured to store state information corresponding to each of the files and wherein the state information corresponding to each of the files includes a duration of streamed data content that is assigned to each file.

4. A computer program product comprising one or more computer-readable storage media having stored computer-executable instructions for implementing a method in a computing system wherein streamed data is received and processed to create a backing store from which the streamed data can be accessed for subsequent utilization, and wherein one or more reader applications are capable of accessing the streamed data contained in the backing store, the method for separating the process of data capture when creating the backing store from the process of reading the backing store, and for enabling one or more reader applications to access the backing store, wherein the method includes the acts of:
  receiving the streamed data from a streamed data source, the streamed data including a plurality of data samples;
  upon receiving the streamed data, using a writer API that is comprised of a first set of primitive operations that are invoked when writing streamed data to the backing store to perform acts of:
    defining each data sample as it is received;
    creating at least one file in the backing store to store each of the data samples;
    creating a shared memory data section containing state information corresponding to the at least one file that can be accessed by the one or more reader applications;
    writing each data sample to the at least one file in the backing store; and
    updating the shared memory data section to indicate changes to the at least one file; and
  upon receiving a request from one or more reader applications to access the streamed data as stored, and through the reader API, performing acts of:
    accessing the state information for the streamed data as stored; and
    permitting the one or more reader applications to access, independent of one another, the streamed data stored in the backing store, consistent with the state information obtained by a given reader application, and without having the first set of primitive operations of the writer API imposed when reading the streamed data from the backing store.

5. A computer program product as recited in claim 4, wherein the streamed data includes multimedia data and non-multimedia data.

6. A computer program product as recited in claim 5, wherein the act of creating at least one file in the backing store to store each of the data samples includes creating at least one file to store the multimedia data and at least one file to store the non-multimedia data.

7. A computer program product as recited in claim 4, wherein the request from the one or more reader applications includes a request for streamed data that has not yet been written to the backing store, and wherein the act of permitting the one or more reader applications to access the streamed data includes the act of creating a notification event in the shared memory data section indicating said request, such that when the requested streamed data is written to the backing store, the reader API permits the one or more reader applications to access the streamed data.

8. A computer program product comprising one or more computer-readable storage media having stored computer-executable instructions for implementing a method in a computing system wherein streamed data is received and processed to create a backing store from which the streamed data can be accessed for subsequent utilization, and wherein one or more reader applications are capable of accessing the streamed data contained in the backing store, the method for separating the process of data capture when creating the backing store from the process of reading the backing store, and for enabling one or more reader applications to access the backing store, wherein the method includes:
  an act of providing a reader API, wherein the reader API is comprised of a first set of primitive operations that are invoked when reading the streamed data from the backing store, wherein the streamed data is written to at least one file in the backing store, and wherein a shared memory data section contains state information corresponding to the at least one file; and
  using the reader API to perform acts comprising:
    receiving a request from one or more reader applications to access the streamed data as stored;
    permitting the one or more reader applications to access the state information for the streamed data as stored; and
    permitting the one or more reader applications to access the streamed data as stored from the at least one file, consistent with the state information, and without having a first set of primitive operations of a writer API imposed when reading the streamed data from the backing store.

9. A computer program product as recited in claim 8, wherein the method further includes:
  an act of providing a writer API, wherein the writer API is comprised of a first set of primitive operations that are invoked when writing the streamed data to the backing store, the first set of primitive operations of the writer API being performed independent of any primitive operations associated with one or more reader applications that read the streamed data as stored; and
  using the writer API to perform acts comprising:
    receiving the streamed data from a streamed data source;
    defining the streamed data as it is received;
    creating a shared memory data section containing state information corresponding to at least one file configured to store the streamed data;
    writing the streamed data to the at least one file; and
    updating the shared memory data section upon writing the streamed data to the at least one file.

10. A computing system comprising:
  a processor; and
  system memory storing computer-executable instructions for implementing a method in which streamed data is received and processed by the computing system to create a backing store from which the streamed data can be accessed for subsequent utilization, and wherein one or more reader applications in communication with the computing system are enabled to access the streamed data contained in the backing store, the method further including:
    a step for writing streamed data in the backing store through a writer API that is comprised of a first set of primitive operations that are invoked when writing the streamed data to the backing store;
    acts of defining and storing in the backing store state information for the streamed data as stored;

an act of permitting one or more reader applications to access the state information for the streamed data as stored; and an act of permitting the one or more reader applications to access, independent of one another, and through a reader API that is comprised of a second set of primitive operations, the streamed data stored in the backing store, consistent with the state information obtained by a given reader application, and without having the first set of primitive operations of the writer API imposed when reading the streamed data from the backing store.

11. A computing system as recited in claim 10, wherein the method further includes:

an act of providing a reader API, wherein the reader API is comprised of a first set of primitive operations that are invoked when reading the streamed data from the backing store, wherein the streamed data is written to at least one file in the backing store, and wherein a shared memory data section contains state information corresponding to the at least one file; and using the reader API to perform acts comprising:

receiving a request from one or more reader applications to access the streamed data as stored;

permitting the one or more reader applications to access the state information for the streamed data as stored; and permitting the one or more reader applications to access the streamed data as stored from the at least one file, consistent with the state information, and without having a first set of primitive operations of a writer API imposed when reading the streamed data from the backing store.

12. A computing system as recited in claim 10, wherein the method further includes:

an act of providing a writer API, wherein the writer API is comprised of a first set of primitive operations that are invoked when writing the streamed data to the backing store, the first set of primitive operations of the writer API being performed independent of any primitive operations associated with one or more reader applications that read the streamed data as stored; and using the writer API to perform acts comprising:

receiving the streamed data from a streamed data source;

defining the streamed data as it is received;

creating a shared memory data section containing state information corresponding to at least one file configured to store the streamed data;

writing the streamed data to the at least one file; and updating the shared memory data section upon writing the streamed data to the at least one file.

13. A computing system as recited in claim 10, wherein the computing system comprises a programmable video recorder.

14. A computing system comprising:

a processor; and system memory storing computer-executable instructions for implementing a method in which streamed data is received and processed by the computing system to create a backing store from which the streamed data can be accessed for subsequent utilization, and wherein one or more reader applications in communication with the computing system are enabled to access the streamed data contained in the backing store, the method further including:

receiving the streamed data from a streamed data source;

upon receiving the streamed data, using a writer API that is comprised of a first set of primitive operations that are invoked when writing streamed data to the backing store to perform acts of:

defining the streamed data as it is received;

writing the streamed data to at least one file in the backing store; and updating a shared memory data section that can be accessed by the one or more reader applications, the shared memory data section containing state information corresponding to the at least one file, wherein the first set of primitive operations are performed independent of any primitive operations associated with one or more reader applications that read the streamed data as stored;

upon receiving a request from the one or more reader applications to access the streamed data as stored, and through the reader API, performing acts of:

accessing the state information for the streamed data as stored; and permitting the one or more reader applications to access, independent of one another, the streamed data stored in the backing store, consistent with the state information obtained by a given reader application, and without having the first set of primitive operations of the writer API imposed when reading the streamed data from the backing store.

15. A computing system as recited in claim 14, wherein writing the streamed data includes creating a plurality of files in the backing store to store the data samples.

16. A computing system as recited in claim 14, wherein updating the shared memory data section further includes creating the shared memory data section.

17. A computing system as recited in claim 14, wherein the computing system comprises a programmable video recorder.

18. A computing system as recited in claim 14, wherein the at least one file is assigned a total duration of streamed data content permitted to be stored within the at least one file.

19. A computing system as recited in claim 14, wherein the at least one file is assigned a type of streamed data content permitted to be stored within the at least one file.

20. A computing system as recited in claim 14, wherein the one or more reader applications includes at least two reader applications.

* * * * *

UNITED STATES PATENT AND TRADEMARK OFFICE
CERTIFICATE OF CORRECTION

| | | |
|---|---|---|
| PATENT NO. | : 7,743,032 B2 | Page 1 of 1 |
| APPLICATION NO. | : 11/868160 | |
| DATED | : June 22, 2010 | |
| INVENTOR(S) | : Matthijs A. Gates et al. | |

It is certified that error appears in the above-identified patent and that said Letters Patent is hereby corrected as shown below:

In column 4, line 28, after "backing" insert -- store; --.

Signed and Sealed this
Tenth Day of May, 2011

David J. Kappos
*Director of the United States Patent and Trademark Office*